(12) United States Patent
Lee et al.

(10) Patent No.: US 9,090,155 B2
(45) Date of Patent: Jul. 28, 2015

(54) POWER TRANSMISSION SYSTEM OF HYBRID ELECTRIC VEHICLE

(71) Applicant: Hyundai Motor Company, Seoul (KR)

(72) Inventors: Chang Wook Lee, Suwon-si (KR); Jongsool Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/052,570

(22) Filed: Oct. 11, 2013

(65) Prior Publication Data
US 2014/0148290 A1 May 29, 2014

(30) Foreign Application Priority Data

Nov. 28, 2012 (KR) ........................ 10-2012-0136468

(51) Int. Cl.
| | |
|---|---|
| *B60K 6/365* | (2007.10) |
| *B60K 6/387* | (2007.10) |
| *B60K 6/445* | (2007.10) |
| B60K 6/38 | (2007.10) |
| B60K 6/48 | (2007.10) |
| F16H 37/08 | (2006.01) |

(52) U.S. Cl.
CPC ................ *B60K 6/365* (2013.01); *B60K 6/387* (2013.01); *B60K 6/445* (2013.01); *B60K 2006/381* (2013.01); *B60K 2006/4841* (2013.01); *F16H 2037/088* (2013.01); *F16H 2037/0873* (2013.01); *F16H 2200/0034* (2013.01); *F16H 2200/2007* (2013.01); *F16H 2200/2038* (2013.01); *Y02T 10/6239* (2013.01); *Y10S 903/902* (2013.01)

(58) Field of Classification Search
None
See application file for complete search history.

(56) References Cited

U.S. PATENT DOCUMENTS

| | | | | |
|---|---|---|---|---|
| 7,192,373 B2 * | 3/2007 | Bucknor et al. | ................... | 475/5 |
| 7,300,374 B2 * | 11/2007 | Bucknor et al. | ................... | 475/5 |
| 8,597,147 B2 * | 12/2013 | Kim et al. | .......................... | 475/5 |

\* cited by examiner

*Primary Examiner* — Roger Pang
*Assistant Examiner* — Alberto Interian, III
(74) *Attorney, Agent, or Firm* — McDermott Will & Emery LLP

(57) ABSTRACT

A power transmission system of a hybrid vehicle may include an input shaft, and an output shaft. A first planetary gear set includes a first rotation element connected to a first motor/generator, a second rotation element operated as an output element, and a third rotation element connected to the input shaft and a second motor/generator. A second planetary gear set includes a fourth rotation element connected to the third rotation element and the second motor/generator, a fifth rotation element connected to the second rotation element through an externally-meshing gear and, and a sixth rotation element connected to a transmission housing. A direct-coupling device connects two rotation elements among the fourth, fifth, and sixth rotation elements of the second planetary gear set, and transfer gears form the externally-meshing gears. Friction elements connect a selected rotation element to a selected transfer gear or a selected rotation element to the transmission housing.

20 Claims, 13 Drawing Sheets

FIG. 2

| mode | shift-speed | friction element | | |
|---|---|---|---|---|
| | | CL1 | CL2 | BK |
| EV | 1ST | | | ● |
| | 2ND | ● | | |
| hybrid input split | 1ST | | | ● |
| | 2ND | ● | | |
| hybrid compound split | - | | ● | |
| engine | 1ST | | ● | ● |
| | 2ND | ● | ● | |

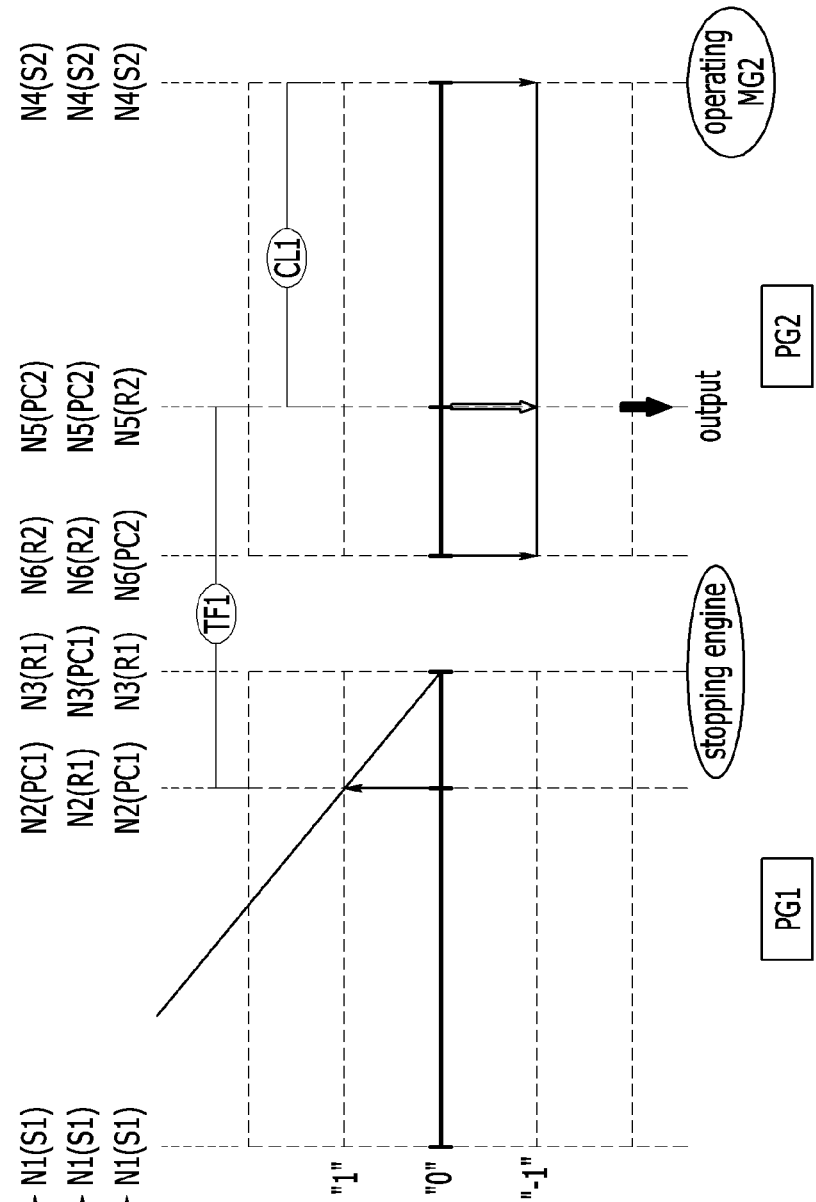

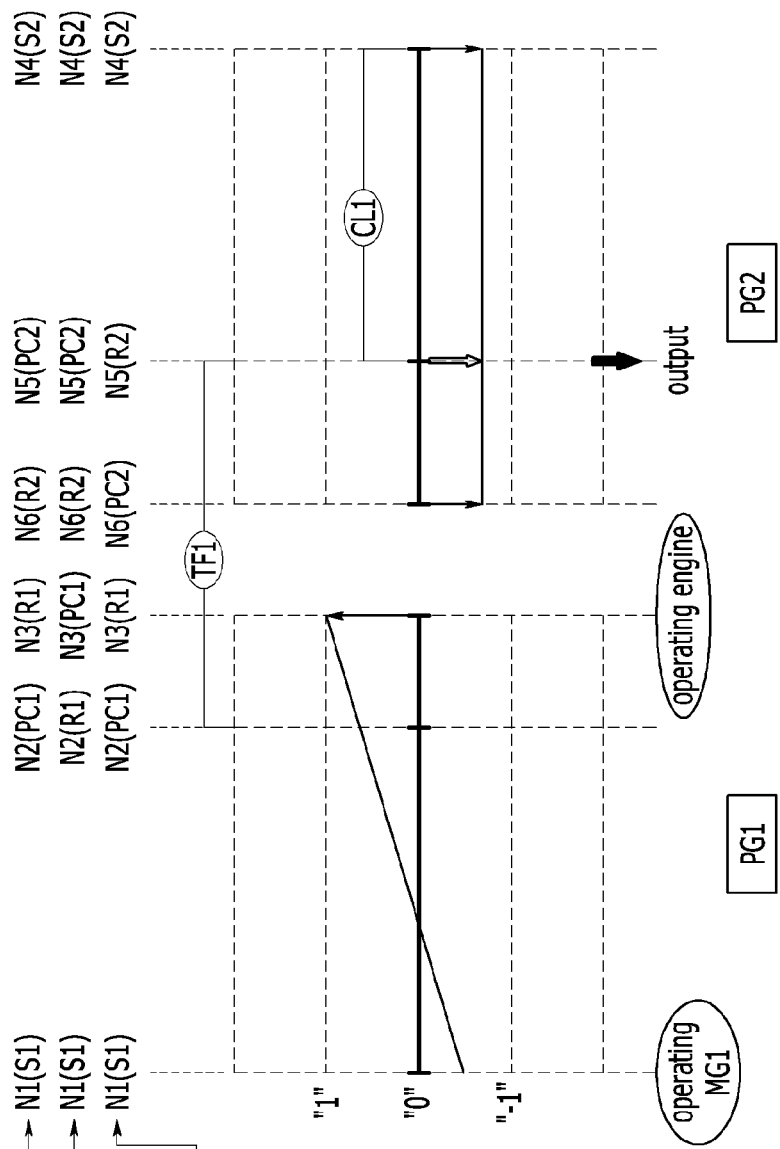

POWER TRANSMISSION SYSTEM OF HYBRID ELECTRIC VEHICLE

CROSS-REFERENCE TO RELATED APPLICATION

This application claims the benefit of priority to Korean Patent Application No. 10-2012-0136468 filed in the Korean Intellectual Property Office on Nov. 28, 2012, the entire contents of which are incorporated herein by reference.

TECHNICAL FIELD

The present disclosure relates to a power transmission system of a hybrid electric vehicle. More particularly, the present disclosure relates to a power transmission system of a hybrid electric vehicle which reduces electric load and uses the maximum power of an engine by giving more importance to the mechanical power delivery path when splitting engine power, decreases the number of mode conversions when starting the vehicle, and minimizes changes in rotation speed of all the rotation elements when converting modes.

BACKGROUND

Environmentally-friendly vehicles are very important for the future of the motor industry. Vehicle manufacturers are focusing on the development of environmentally-friendly vehicles, such as electric vehicles (EV), hybrid electric vehicles (HEV), and fuel cell electric vehicles (FCEV) so as to meet environmental and fuel consumption regulations.

The vehicle manufacturers have been focusing on gas emission regulations and improving fuel consumption performance restrictions in view of heightened weight and cost, and are competing to commercialize the hybrid electric vehicles.

The hybrid electric vehicles use more than two power sources. Gasoline engines or diesel engines using fossil fuel and motor/generators driven by electrical energy are the two main power sources of hybrid electric vehicles. A the motor/generator having relatively low-speed torque characteristics is used as a main power source at low-speed, and an engine having relatively high-speed torque characteristics is used as a main power source at high-speed.

Since the hybrid electric vehicle stops using fossil fuel and uses the motor/generator when operating the vehicle at a low-speed region, fuel consumption may be improved and exhaust gas may be reduced.

The power transmission system of a hybrid electric vehicle is classified into a single-mode type and a multi-mode type.

According to the single-mode type, even though a torque delivery apparatus such as a clutch and a brake for shifting is not necessary, fuel consumption is high due to deterioration of efficiency at a high-speed region and an additional torque multiplication device is required for a large vehicle.

Because the multi-mode type has high efficiency at the high-speed region and is able to multiply torque autonomously, the multi-mode type can be applied to a full size vehicle. The multi-mode type as the power transmission system of a hybrid electric vehicle is under continuous investigation.

The power transmission system of the multi-mode type includes a plurality of planetary gear sets, a plurality of motor/generators, a plurality of torque delivery apparatus controlling rotation elements of the planetary gear sets, and a battery used as a power source of the motor/generators.

The power transmission system of the multi-mode type has different operating mechanisms depending on connections of the planetary gear sets, the motor/generators, and the torque delivery apparatus.

In addition, the power transmission system of the multi-mode type has different features such as durability, power delivery efficiency, and size depending on the connections of the planetary gear sets, the motor/generators, and the torque delivery apparatus. Therefore, designs for the connection structure of the power transmission system of a hybrid electric vehicle have been under continuous investigation to achieve robust and compact power transmission system having no power loss.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a power transmission system of a hybrid electric vehicle having advantages of reducing electric load and using maximum power of an engine by focusing on a mechanical power delivery path when splitting engine power, decreasing the number of mode conversions when starting the vehicle, and minimizing changes in rotation speed of all the rotation elements when converting modes.

A power transmission system of a hybrid electric vehicle according to an aspect of the present disclosure may include an input shaft receiving torque of an engine, and an output shaft disposed in parallel with the input shaft. A first planetary gear set is disposed on the input shaft and includes a first rotation element connected to a first motor/generator, a second rotation element operating as an output element, and a third rotation element directly connected to the input shaft and selectively connected to a second motor/generator. A second planetary gear set is disposed on the output shaft and includes a fourth rotation element selectively connected to the third rotation element and always connected to the second motor/generator through an externally-meshing gear. A fifth rotation element is connected to the second rotation element through an externally-meshing gear and connected to the output shaft, and a sixth rotation element is selectively connected to a transmission housing. A direct-coupling device connects two rotation elements among the fourth, fifth, and sixth rotation elements of the second planetary gear set, and transfer gears form the externally-meshing gears. Friction elements selectively connect a selected rotation element to a selected transfer gear or selectively connect a selected rotation element to the transmission housing.

In the exemplary embodiments, the first planetary gear set may be a first single pinion planetary gear set, the first single pinion planetary gear set having a first sun gear as the first rotation element, a first planet carrier as the second rotation element, and a first ring gear as the third rotation element. The second planetary gear set may be a second single pinion planetary gear set, the second single planetary gear set having a second sun gear as the fourth rotation element, a second planet carrier as the fifth rotation element, and a second ring gear as the sixth rotation element.

In the exemplary embodiments, the first planetary gear set may be a double pinion planetary gear set, the double pinion planetary gear set having a first sun gear as the first rotation element, a first ring gear as the second rotation element, and a first planet carrier as the third rotation element. The second planetary gear set may be a single pinion planetary gear set, the single pinion planetary gear set having a second sun gear as the fourth rotation element, a second planet carrier as the fifth rotation element, and a second ring gear as the sixth rotation element.

In the exemplary embodiments, the first planetary gear set may be a single pinion planetary gear set, the single pinion planetary gear set having a first sun gear as the first rotation element, a first planet carrier as the second rotation element, and a first ring gear as the third rotation element. The second planetary gear set may be a double pinion planetary gear set, the double pinion planetary gear set having a second sun gear as the fourth rotation element, a second ring gear as the fifth rotation element, and a second planet carrier as the sixth rotation element.

In the exemplary embodiments, the direct-coupling device may be a first clutch disposed between the fourth rotation element and the fifth rotation element.

In the exemplary embodiments, the direct-coupling device may be a first clutch disposed between the fourth rotation element and the sixth rotation element.

In the exemplary embodiments, the direct-coupling device may be a first clutch disposed between the fifth rotation element and the sixth rotation element.

The transfer gears may include a first transfer gear disposed between the second rotation element and the fifth rotation element, and a second transfer gear disposed between the third rotation element and the fourth rotation element.

In the exemplary embodiments, the friction elements may include a brake disposed between the sixth rotation element and the transmission housing, and a second clutch disposed between the third rotation element and the second transfer gear.

In the exemplary embodiments, the friction elements may include: a brake disposed between the sixth rotation element and the transmission housing, and a second clutch disposed between the fourth rotation element and the second transfer gear.

The direct-coupling device may include a first clutch and the friction elements may include a brake and a second clutch, wherein the brake is operated at a first electric vehicle (EV) mode, the first clutch is operated at a second EV mode, the brake is operated at a first hybrid operation mode, the first clutch is operated at a second hybrid operation mode, the second clutch is operated at a third hybrid operation mode, the second clutch and the brake are operated at a first engine mode, and the first clutch and the second clutch are operated at a second engine mode.

A power transmission system of a hybrid electric vehicle according to another aspect of the present disclosure may include an input shaft receiving a torque of an engine and an output shaft disposed in parallel with the input shaft. A first planetary gear set is disposed on the input shaft and includes a first rotation element connected to a first motor/generator, a second rotation element, and a third rotation element directly connected to the input shaft and selectively connected to a second motor/generator A second planetary gear set is disposed on the output shaft and includes a fourth rotation element selectively connected to the third rotation element and always connected to the second motor/generator, a fifth rotation element connected to the second rotation element and connected to the output shaft, and a sixth rotation element selectively connected to a transmission housing. A first clutch connects two rotation elements among the fourth, fifth, and sixth rotation elements of the second planetary gear set. A first transfer gear is disposed between the second rotation element and the fifth rotation element, and a second transfer gear is disposed between the third rotation element and the fourth rotation element. Friction elements include a brake and a second clutch.

In the exemplary embodiments, the first planetary gear set may be a first single pinion planetary gear set, the first single pinion planetary gear set having a first sun gear as the first rotation element, a first planet carrier as the second rotation element, and a first ring gear as the third rotation element. The second planetary gear set may be a second single pinion planetary gear set, the second single pinion planetary gear set having a second sun gear as the fourth rotation element, a second planet carrier as the fifth rotation element, and a second ring gear as the sixth rotation element.

In the exemplary embodiments, the first planetary gear set may be a double pinion planetary gear set, the double pinion planetary gear set having a first sun gear as the first rotation element, a first ring gear as the second rotation element, and a first planet carrier as the third rotation element. The second planetary gear set may be a single pinion planetary gear set, the single pinion planetary gear set having a second sun gear as the fourth rotation element, a second planet carrier as the fifth rotation element, and a second ring gear as the sixth rotation element.

In the exemplary embodiments, the first planetary gear set may be a single pinion planetary gear set, the single pinion planetary gear set having a first sun gear as the first rotation element, a first planet carrier as the second rotation element, and a first ring gear as the third rotation element. The second planetary gear set may be a double pinion planetary gear set, the double pinion planetary gear set having a second sun gear as the fourth rotation element, a second ring gear as the fifth rotation element, and a second planet carrier as the sixth rotation element.

In the exemplary embodiments, the first clutch may be disposed between the fourth rotation element and the fifth rotation element.

In the exemplary embodiments, the first clutch may be disposed between the fourth rotation element and the sixth rotation element.

In the exemplary embodiments, the first clutch may be disposed between the fifth rotation element and the sixth rotation element.

In the exemplary embodiments, the friction elements may include: a brake disposed between the sixth rotation element and the transmission housing; and a second clutch disposed between the third rotation element and the second transfer gear.

In the exemplary embodiments, the friction elements may include a brake disposed between the sixth rotation element and the transmission housing, and a second clutch disposed between the fourth rotation element and the second transfer gear.

BRIEF DESCRIPTION OF THE DRAWINGS

FIG. 2 is an operational chart of friction elements at each mode applied to a power transmission system according to the first exemplary embodiment of the present disclosure.

FIG. 3B is a lever diagram of a power transmission system at the second EV mode according to the first exemplary embodiment of the present disclosure.

FIG. 4B is a lever diagram of a power transmission system at the second hybrid operation mode according to the first exemplary embodiment of the present disclosure.

DETAILED DESCRIPTION

Figure 1:
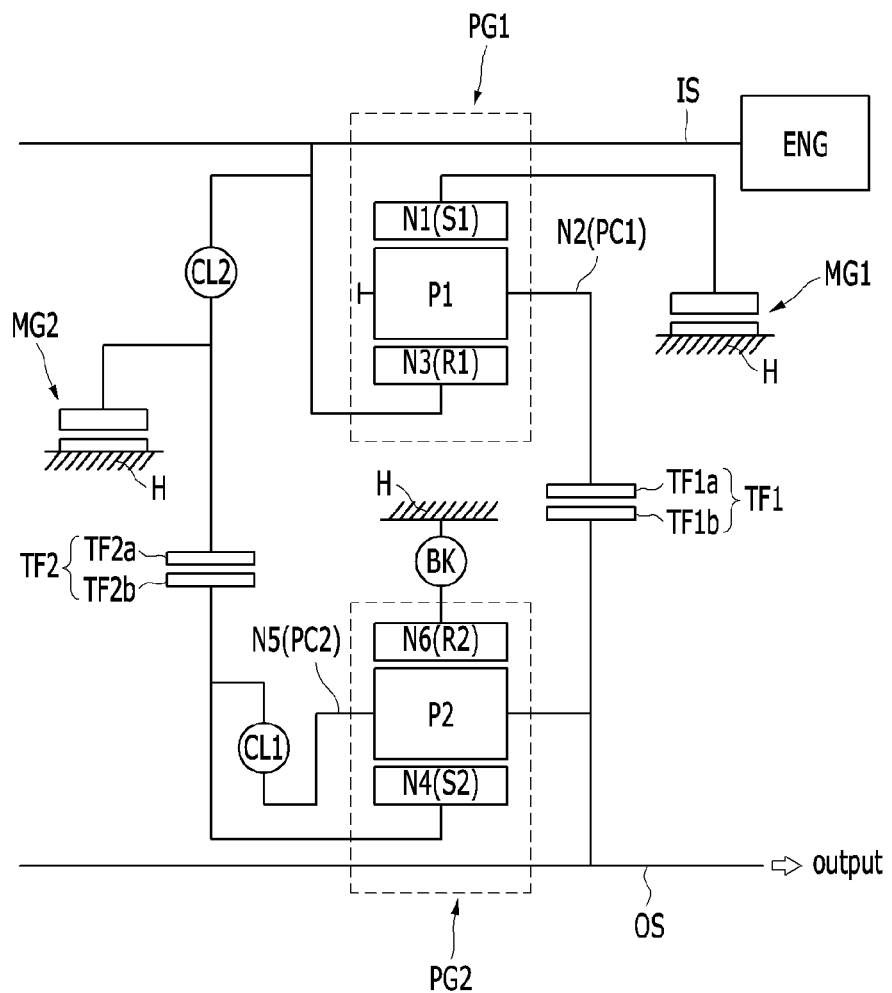
FIG. 1 is a schematic diagram of a power transmission system according to the first exemplary embodiment of the present disclosure.

Exemplary embodiments of the present disclosure will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system according to the first exemplary embodiment of the present disclosure.

Referring to FIG. 1, a power transmission system of a hybrid electric vehicle according to the first exemplary embodiment of the present disclosure includes a first planetary gear set PG1 disposed on an input shaft IS, a second planetary gear set PG2 disposed on an output shaft OS in parallel with the input shaft IS, two transfer gears TF1 and TF2, friction elements consisting of two clutches CL1 and CL2 and one brake BK, and two motor/generators MG1 and MG2.

The first and second planetary gear sets PG1 and PG2 convert torque of an engine ENG input from the input shaft IS and torque of the first and second motor/generators MG1 and MG2, and output the converted torque through the output shaft OS.

The input shaft IS is an input member and receives a torque from the engine ENG. The output shaft OS is an output member and delivers a driving torque to a driving wheel through a differential apparatus (not shown).

The first planetary gear set PG1 is a single pinion planetary gear set and includes a first sun gear S1 as a first rotation element N1 and a first planet carrier PC1 rotatably supporting a first pinion P1 externally meshed with the first sun gear S1 and as a second rotation element N2. A first ring gear R1 is internally meshed with the first pinion P1 and is a third rotation element N3.

The second planetary gear set PG2 is a single pinion planetary gear set and includes a second sun gear S2 as a fourth rotation element N4 and a second planet carrier PC2 rotatably supporting a second pinion P2 externally meshed with the second sun gear S2 and as a fifth rotation element N5. A second ring gear R2 is internally meshed with the second pinion P2 and is a sixth rotation element N6.

The third rotation element N3 of the first planetary gear set PG1 is directly connected to the input shaft IS, and the fifth rotation element N5 of the second planetary gear set PG2 is directly connected to the output shaft OS.

The first and second planetary gear sets PG1 and PG2 are combined by first and second transfer gears TF1 and TF2 and first and second clutches CL1 and CL2 and a brake BK.

The first and second transfer gears TF1 and TF2 respectively have first and second transfer drive gears TF1a and TF2a and first and second transfer driven gear TF1b and TF2b externally meshed with each other.

The first transfer gear TF1 externally connects the second rotation element N2 with the fifth rotation element N5.

The second transfer gear TF2 externally connects the third rotation element N3 including the input shaft IS with the fourth rotation element N4.

Therefore, the rotation elements connected with each other through the first and second transfer gears TF1 and TF2 rotate in opposite direction to each other according to gear ratios of the first and second transfer gears TF1 and TF2.

The first and second clutches CL1 and CL2 and the brake BK, which are the friction elements, are disposed as follows. The first clutch CL1 selectively connects the fourth rotation element N4 with the fifth rotation element N5 and operates as a direct-coupling device of the second planetary gear set PG2. The second clutch CL2 selectively connects the third rotation element N3 including the input shaft IS with the second transfer gear TF2.

The first clutch CL1 is the direct-coupling device which selectively connects two rotation elements of the second planetary gear set PG2. Therefore, the second planetary gear set PG2 becomes a direct-coupling state selectively, and the second clutch CL2 selectively delivers torque of the input shaft IS to the fourth rotation element N4.

In addition, the brake BK selectively connects the sixth rotation element N6 with the transmission housing H.

The friction elements consisting of the first and second clutches CL1 and CL2 and the brake BK may be conventional wet type multi-plate friction elements operated by hydraulic pressure. The first motor/generator MG1 and the second motor/generator MG2 are independent power sources and are operated as a motor and a generator. The first motor/generator MG1 is connected to the first rotation element N1 of the first planetary gear set PG1 so as to supply torque to the first rotation element N1 or to generate electricity by torque of the first rotation element N1. The second motor/generator MG2 is connected to the second transfer drive gear TF2a so as to supply torque to the second transfer drive gear TF2a or to generate electricity by torque of the second transfer drive gear TF2a.

Stators of the first motor/generator MG1 and the second motor/generator MG2 are fixed to the transmission housing H, and rotors of the first motor/generator MG1 and the second motor/generator MG2 are connected respectively to the first rotation element N1 and the second transfer drive gear TF2a.

FIG. 2 is an operational chart of friction elements at each mode applied to a power transmission system according to the first exemplary embodiment of the present disclosure.

Referring to FIG. 2, a first electric vehicle (EV) mode is achieved by operating the brake BK. A second EV mode is achieved by operating the first clutch CL1. A first hybrid operation mode is achieved by operating the brake BK. A second hybrid operation mode is achieved by operating the first clutch CL1. A third hybrid operation mode is achieved by operating the second clutch CL2. A first engine mode is achieved by operating the second clutch CL2 and the brake BK. And a second engine mode is achieved by operating the first clutch CL1 and the second clutch CL2.

As described above, the power transmission system can realize two EV modes, three hybrid operation modes, and two engine modes.

FIGS. 3A, 3B, 4A, 4B, 5, 6A and 6B are lever diagrams of the power transmission system according to the first exemplary embodiment of the present disclosure for explaining each mode by lever analysis method.

Referring to FIGS. 3A, 3B, 4A, 4B, 5, 6A and 6B, three vertical lines of the first planetary gear set PG1 are set as the first, second, and third rotation elements N1, N2, and N3. Three vertical lines of the second planetary gear set PG2 are set as the sixth, the fifth, and the fourth rotation elements N6, N5, and N4 from the left to the right. A middle horizontal line represents a rotation speed of "0", upper horizontal lines represent positive rotation speeds, and lower horizontal lines represent negative rotation speeds.

The negative rotation speeds mean that the rotational elements are rotated in an opposite direction of the rotating direction of the engine ENG since the first planetary gear set PG1 and the second planetary gear set PG2 are externally meshed with each other through the first and second transfer gears TF1 and TF2 without an idling gear.

In addition, distances between the vertical lines of the first and second planetary gear sets PG1 and PG2 are set according to gear ratios (teeth number of a sun gear/teeth number of a ring gear) of the first and second planetary gear sets PG1 and PG2.

[First EV Mode]

Figure 3A:
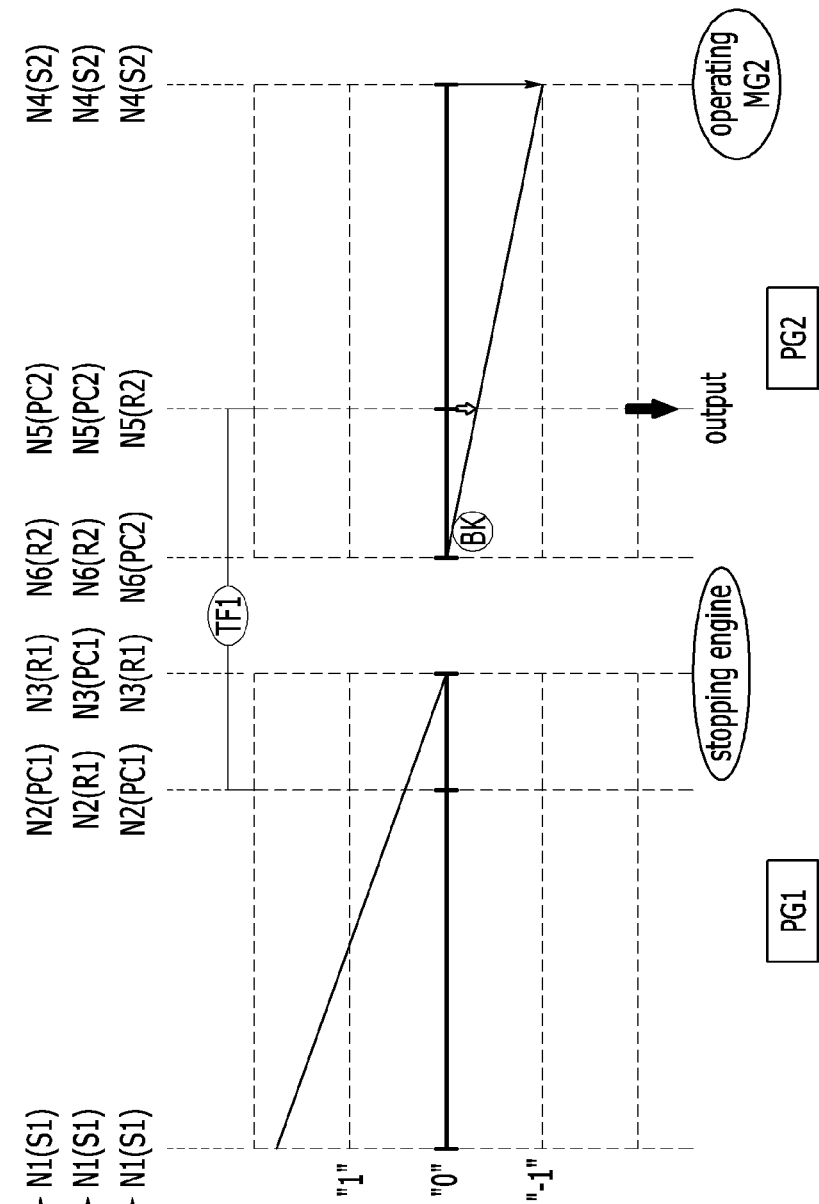
FIG. 3A is a lever diagram of a power transmission system at the first electric vehicle (EV) mode according to the first exemplary embodiment of the present disclosure.

FIG. 3A is lever diagram at the first EV mode.

The EV mode is a mode where power of a battery is supplied to a motor/generator in a stopped state of an engine such that a vehicle is driven by power of the motor/generator. Since the engine is stopped, fuel economy may be enhanced, and the vehicle can move rearward without an additional reverse speed device at the EV mode.

The EV mode is utilized when the vehicle starts in a stopped state or the vehicle runs at low speed. A reduced gear ratio where the power source rotates faster than an output member is required for assisting hill-start or quick acceleration.

The sixth rotation element N6 is operated as a fixed element by operation of the brake BK, and the second motor/generator MG2 inputs torque of the second motor/generator MG2 to the fourth rotation element N4 at the first EV mode. Therefore, the torque of the second motor/generator MG2 changes according to the gear ratio of the second planetary gear set PG2, and driving torque outputs through the fifth rotation element N5.

Here, the first planetary gear set PG1 does not shift. However, the third rotation element N3 is stopped together with the engine, and the second rotation element N2 is connected to the fifth rotation element N5 through the first transfer gear TF1. Therefore, the first and second rotation elements N1 and N2 are idling.

[Second EV Mode]

FIG. 3B is a lever diagram at the second EV mode.

Efficiency of the motor/generator changes according to rotation speed and torque thereof. Therefore, conversion ratio of electrical energy to mechanical energy changes according to the rotation speed and the torque of the motor/generator even though the same amount of current is supplied.

Battery current used at EV mode is generated by burning fuel in the engine or being accumulated by regenerative braking. The efficient use of the accumulated energy has a direct effect on enhancement of fuel economy.

For this reason, a transmission realizing more than two shift-speeds is increasingly employed in the electric vehicle, and the hybrid electric vehicle realizing the EV mode having more than two shift-speeds is advantageous. Therefore, the exemplary embodiment of the present disclosure can realize two EV modes.

Shifting processes to the second EV mode are as follows. If vehicle speed increases while driving the vehicle at the first EV mode, efficiency of the second motor/generator MG2 is deteriorated. Here, if the brake BK is released and the first clutch CL1 is operated at a point where the efficiency of the second motor/generator MG2 is deteriorated, the second EV mode begins.

Since the first clutch CL1 that is the direct-coupling device of the second planetary gear set PG2 is operated, the second planetary gear set PG2 becomes a direct-coupling state. Therefore, all the rotation elements N4, N5, and N6 of the second planetary gear set PG2 rotate with the same speed and the driving torque is output through the fifth rotation element N5.

Here, the first planetary gear set PG1 does not shift. However, the third rotation element N3 stops together with the engine, and the first and second rotation elements N1 and N2 idle.

[First Hybrid Operation Mode]

Figure 4A:
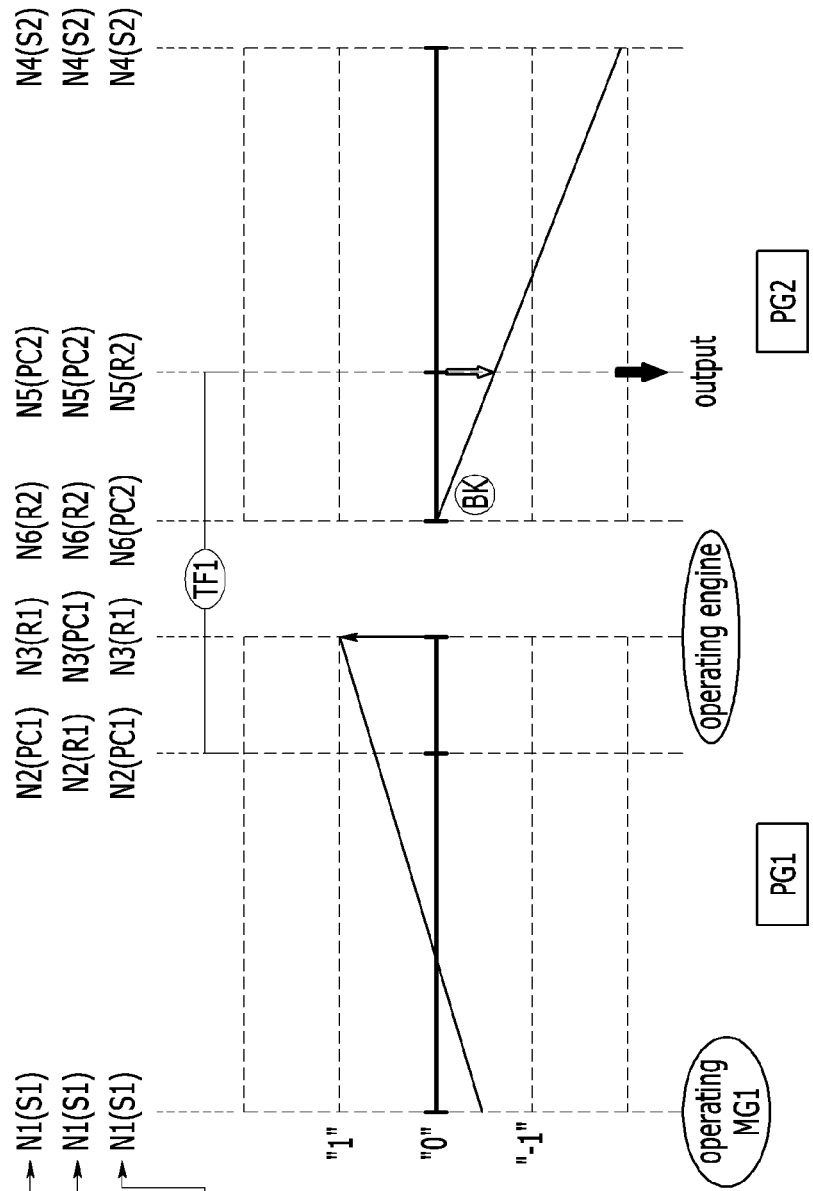
FIG. 4A is a lever diagram of a power transmission system at the first hybrid operation mode according to the first exemplary embodiment of the present disclosure.

FIG. 4A is a lever diagram at the first hybrid operation mode.

The torque of the engine is delivered to the output member through mechanical path and an electrical path at the hybrid input split mode by the planetary gear set. Since the engine and the motor/generator connected to the planetary gear set control their rotation speeds regardless of the vehicle speed, the power transmission system at the hybrid input split mode is operated as an electric continuously variable transmission.

The speed and the torque of the engine are fixed at given vehicle speed in a conventional transmission, whereas the speed and the torque of the engine can be changed freely at the given vehicle speed in the electric continuously variable transmission. Therefore, driving efficiency of the engine may be maximized and fuel economy may be enhanced.

Shifting processes to the first hybrid operation mode are as follows. The second rotation element N2 is connected to the fifth rotation element N5 through the first transfer gear TF1, whereas the first and second rotation elements N1 and N2 idle at the EV modes.

If the engine ENG starts using the first motor generator MG1, speeds of the engine ENG and the first motor/generator MG1 can be controlled regardless of the vehicle speed.

When the engine ENG and the first motor/generator MG1 are controlled, the torque of the engine and the torque of the first motor/generator MG1 are summed. The summed torque is delivered to the fifth rotation element N5 that is the output element through the first transfer gear TF1, thus generating high driving torque.

The sixth rotation element N6 is operated as the fixed element by operation of the brake BK, the driving torque is output through the fifth rotation element N5, and the fourth rotation element N4 idles by receiving the torque of the second motor/generator in the second planetary gear set PG2.

The engine ENG and the first motor/generator MG1 can be controlled independently at the first hybrid operation mode, thus enhancing fuel economy and driving performance.

[Second Hybrid Operation Mode]

FIG. 4B is a lever diagram at the second hybrid operation mode.

If the vehicle speed is increased while driving the vehicle at the first hybrid operation mode, the brake BK is released and the first clutch CL1 lowers rotation speeds of all the rotation elements of the first planetary gear set PG1. Accordingly, the second hybrid operation mode begins.

Since the first clutch CL1 that is the direct-coupling device of the second planetary gear set PG2 is operated, the second planetary gear set PG2 becomes a direct-coupling state. Therefore, all the rotation elements N4, N5, and N6 of the second planetary gear set PG2 rotate with the same speed and the driving torque is output through the fifth rotation element N5.

The engine ENG and the first motor/generator MG1 can be controlled independently at the second hybrid operation mode similar to the first hybrid operation mode, thus improving fuel economy and driving performance.

[Third Hybrid Operation Mode]

Figure 5:
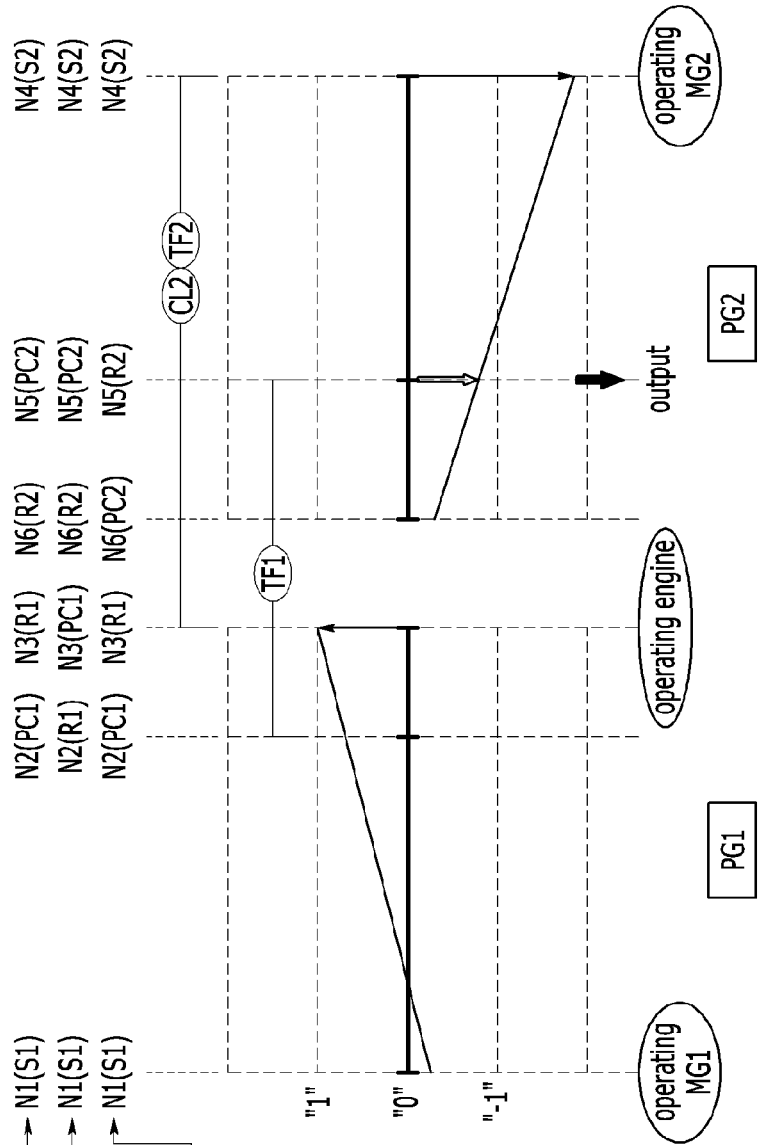
FIG. 5 is a lever diagram of a power transmission system at the third hybrid operation mode according to the first exemplary embodiment of the present disclosure.

FIG. 5 is a lever diagram at the third hybrid operation mode.

The rotation speed of the motor/generator connected to the output element is restricted to the vehicle speed, therefore limiting the motor/generator operation and capacity of the motor/generator at the hybrid input split mode.

Particularly, if the rotation speed of the motor/generator restricted to the vehicle speed is high due to high vehicle speed, efficiency of the motor/generator and fuel economy may be reduced.

Under such conditions, two rotation elements of the first planetary gear set PG1 connected to the engine ENG and two rotation elements of the second planetary gear set PG2 connected to the output shaft OS are coupled. Thus, the rotation speed of the engine and the rotation speeds of two motor/generators are controlled regardless the vehicle speed. Thereby, the power transmission system may be operated as a continuously variable transmission and may enhance fuel economy.

When the second clutch CL2 is operated, the third rotation element N3 is connected to the fourth rotation element N4 through the second transfer gear TF2. Therefore, the speeds and the torques of the third and fourth rotation elements N3 and N4 are restricted to each other.

To balance electrical energy of the first and second motor/generators MG1 and MG2, the speeds and the torques of all the rotation elements of the first and second planetary gear sets PG1 and PG2 are correlated to each other, and the power transmission system operates as the electric continuously variable transmission at the third hybrid operation mode.

The first hybrid operation mode and the second hybrid operation mode can be converted into the third hybrid operation mode. That is, when the first hybrid operation mode and the second hybrid operation mode are converted into the third hybrid operation mode, the engine ENG and the first motor/generator MG1 are controlled so that the rotation elements of the first planetary gear set PG1 synchronize with the rotation elements of the second planetary gear set PG2. Then, the second clutch CL2 is operated.

When the first hybrid operation mode is converted into the third hybrid operation mode, the second clutch CL2 is operated, and the brake BK is released. When the second hybrid operation mode is converted into the third hybrid operation mode, the second clutch CL2 is operated, and the first clutch CL1 is released.

Since the sixth rotation element N6 cannot receive the torque at the third hybrid operation mode, a sum of the torque input to the fourth rotation element N4 and a sum of the torque input to the fifth rotation element N5 are "0", respectively.

That is, the torque of the second motor/generator MG2 and external torque input from the second transfer gear TF2 are balanced at the fourth rotation element N4.

In addition, torque input by drive resistance and external torque input from the first transfer gear TF1 are balanced at the fifth rotation element N5.

[First Engine Mode]

Figure 6A:
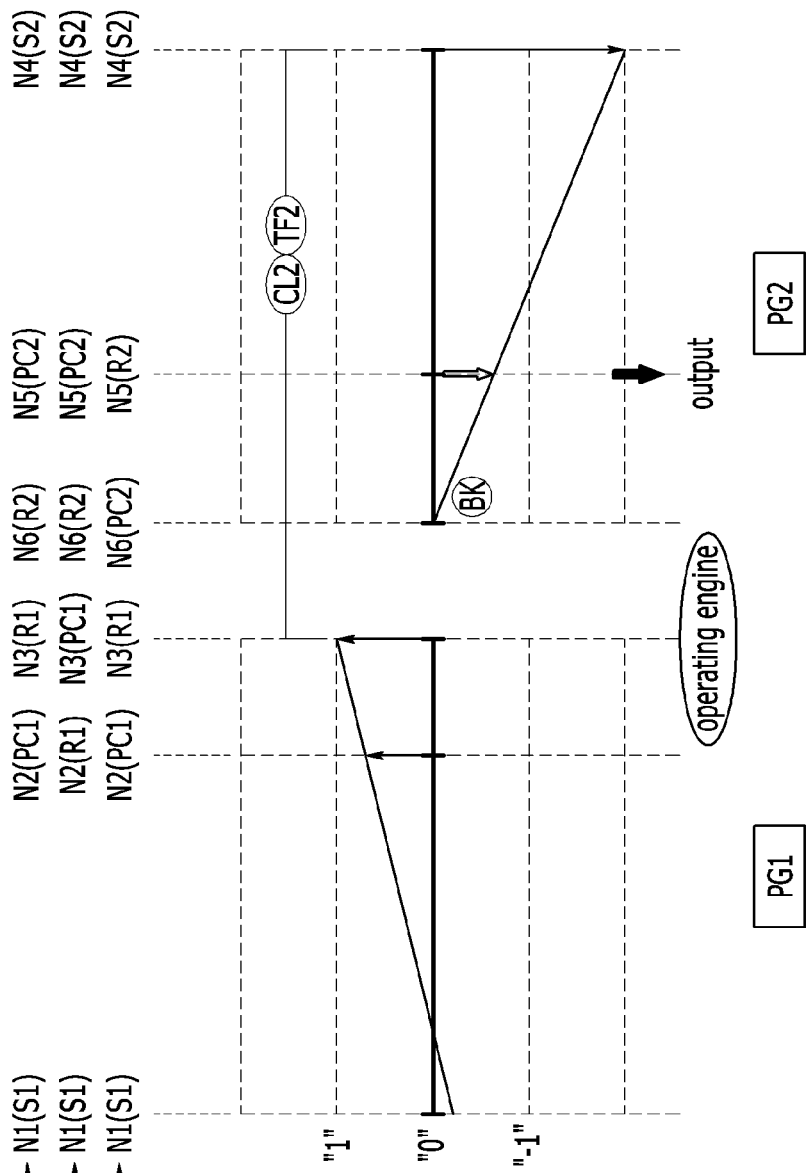
FIG. 6A is a lever diagram of a power transmission system at the first engine mode according to the first exemplary embodiment of the present disclosure.

FIG. 6A is a lever diagram at the first engine mode.

An important technique in the hybrid electric vehicle for enhancing fuel economy is recovery and reuse of brake energy and control of the driving point of the engine. Controlling of the driving point of the engine accompanies conversion of mechanical energy of the engine into electric energy of the motor/generator and conversion of the electric energy of the motor/generator back into mechanical energy at the motor/generator. During the energy conversion, not all input energy is output, thereby, energy loss occurs.

Since the vehicle driven only by the engine may have better fuel economy than the hybrid mode at any driving condition, the exemplary embodiments of the present disclosure provide two engine modes.

That is, the second clutch CL2 and the brake BK are engaged at the first engine mode. In this case, the rotation speed of the engine ENG is delivered to the second planetary gear set PG2 through the second transfer gear TF2 such that the fourth rotation element N4 rotates in an opposite direction to the engine ENG, and the sixth rotation element N6 stops, thereby reducing the gear ratio.

Since the first and second motor/generators MG1 and MG2 do not need to provide torque, the first engine mode at which the vehicle is driven only by the engine ENG is achieved.

The torque of the engine ENG is delivered to the fourth rotation element N4 through the second transfer gear TF2, delivering the drive resistance to the fifth rotation element N5.

In addition, the sixth rotation element N6 receives negative torque from the brake BK, and the first engine mode is achieved.

[Second Engine Mode]

Figure 6B:
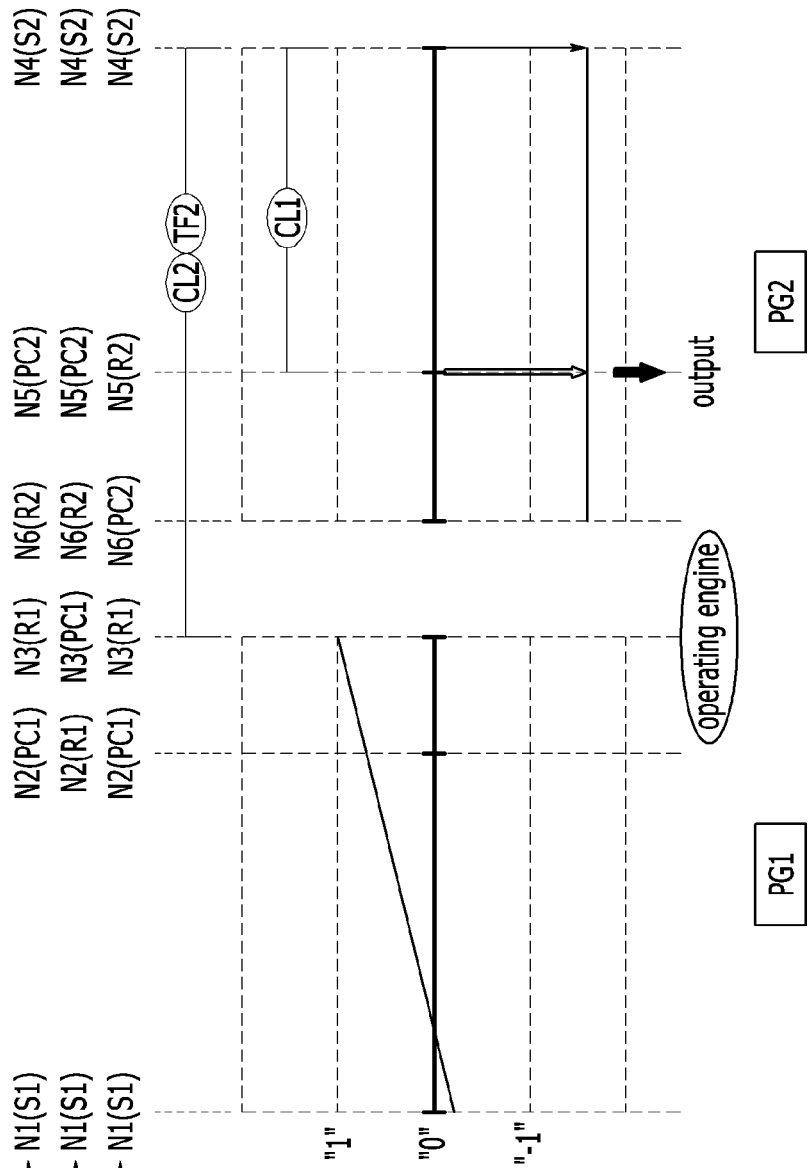
FIG. 6B is a lever diagram of a power transmission system at the second engine mode according to the first exemplary embodiment of the present disclosure.

FIG. 6B is a lever diagram at the second engine mode.

If the vehicle speed increases while driving the vehicle at the first engine mode, the first clutch CL1 and the second clutch C2 are engaged so as to enter the second engine mode.

The speed of the engine ENG is delivered to the second planetary gear set PG2 through the second transfer gear TF2, and the fourth rotation element N4 and the engine ENG rotate in opposite directions. All the rotation elements N4, N5, and N6 of the second planetary gear set PG2 rotate with the same rotation speed by operation of the first clutch CL1.

Since the rotation speed of the second motor/generator MG2 is faster than that of the engine ENG, the gear ratio of the second transfer gear TF2 increases. The second engine mode driven only by the engine ENG is achieved since the first and second motor/generators MG1 and MG2 do not provide torque.

According to the first exemplary embodiment of the present disclosure, two EV modes, three hybrid operation modes, and two engine modes can be achieved by combining two planetary gear sets PG1 and PG2, two transfer gears TF1 and TF2, three friction elements CL1, CL2, and BK, and two motor/generators MG1 and MG2.

Optimum gear ratios may be set due to the ease of changing gear ratios by using two transfer gears as externally-meshed gears as well as the planetary gear sets. Gear ratios can be changed according to target performance, thus improving starting performance, power delivery performance, and fuel economy.

Since sufficient power performance is provided in a wide open throttle (WOT) start, converting to the engine mode is limited, and maximum power of the engine can be used in the conversion between the hybrid input split mode and the compound split mode.

The electric load may be reduced, and the maximum power of the engine may be used by giving more importance to the mechanical power delivery path when splitting the engine power. Further, the number of mode conversions may be decreased when starting the vehicle, and a change in rotation speed of all the rotation elements may be minimized when converting modes.

Since the engine mode is provided, the vehicle can run with high speed without electric load of the motor/generator, thus improving fuel economy.

Figure 7:
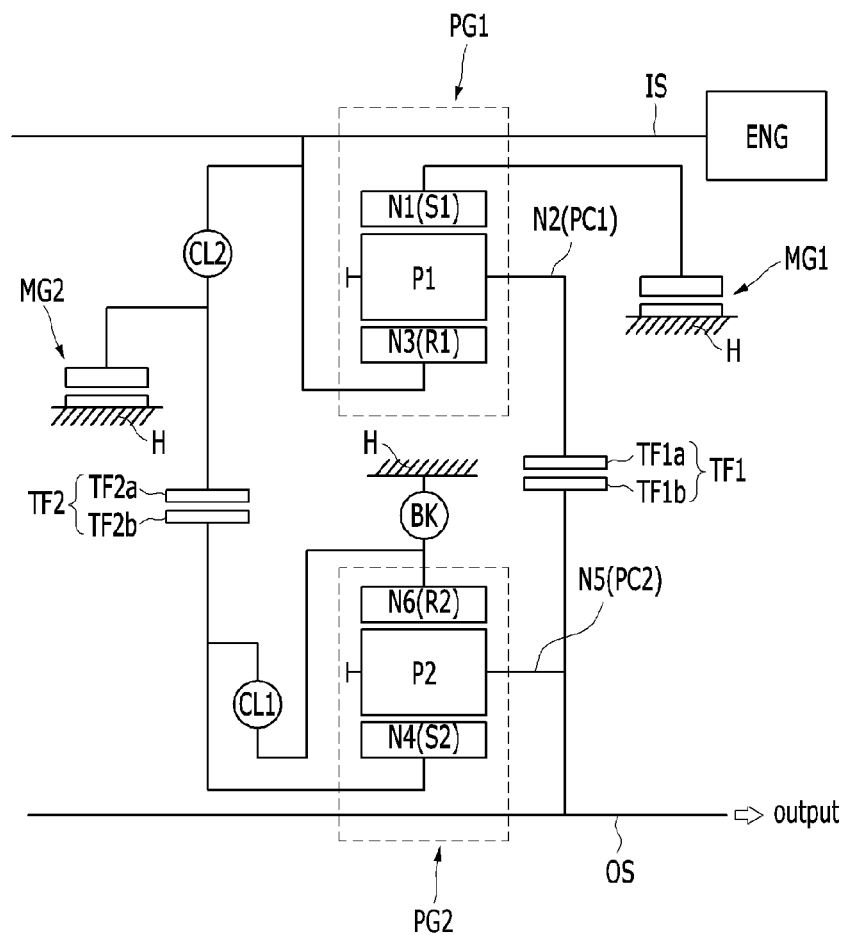
FIG. 7 is a schematic diagram of a power transmission system according to the second exemplary embodiment of the present disclosure.

FIG. 7 is a schematic diagram of a power transmission system according to the second exemplary embodiment of the present disclosure.

Referring to FIG. 7, the first clutch CL1 is disposed between the fourth rotation element N4 and the sixth rotation element N6 in the second exemplary embodiment, whereas the first clutch CL1 is disposed between the fourth rotation element N4 and the fifth rotation element N5 in the first exemplary embodiment.

Since the second exemplary embodiment have the same functions as those of the first exemplary embodiment except the position of the first clutch CL1, detailed description thereof will be omitted.

Figure 8:
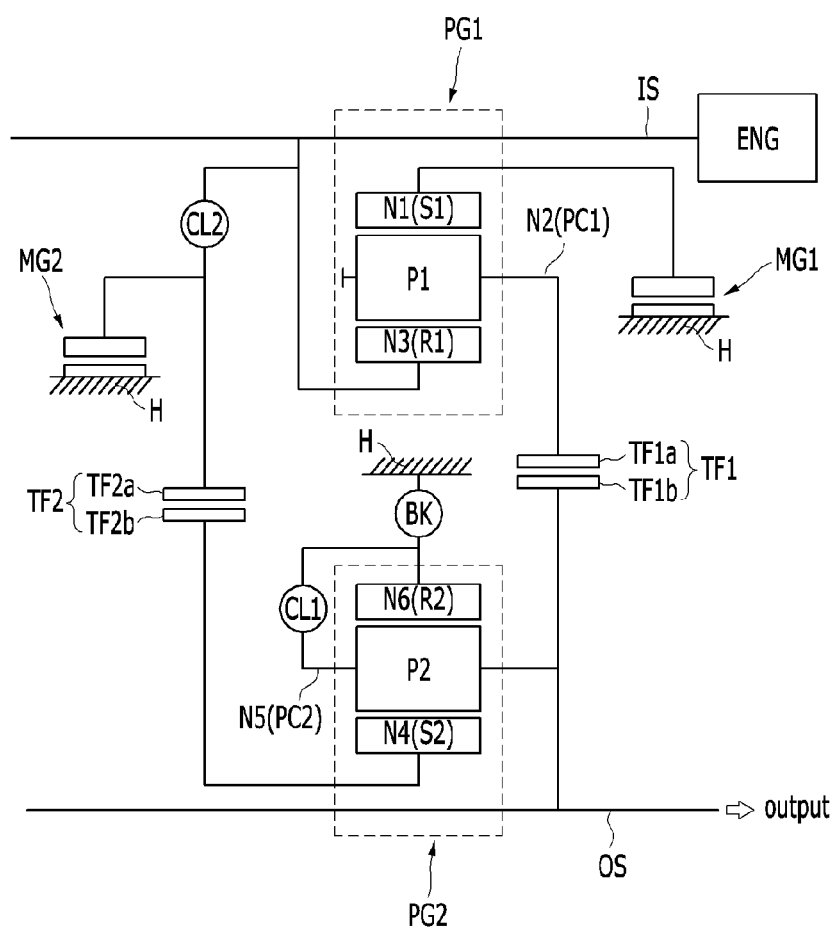
FIG. 8 is a schematic diagram of a power transmission system according to the third exemplary embodiment of the present disclosure.

FIG. 8 is a schematic diagram of a power transmission system according to the third exemplary embodiment of the present disclosure.

Referring to FIG. 8, the first clutch CL1 is disposed between the fifth rotation element N5 and the sixth rotation element N6 in the third exemplary embodiment, whereas the first clutch CL1 is disposed between the fourth rotation element N4 and the fifth rotation element N5 in the first exemplary embodiment.

Since the third exemplary embodiment have the same functions as those of the first exemplary embodiment except the position of the first clutch CL1, detailed description thereof will be omitted.

Figure 9:
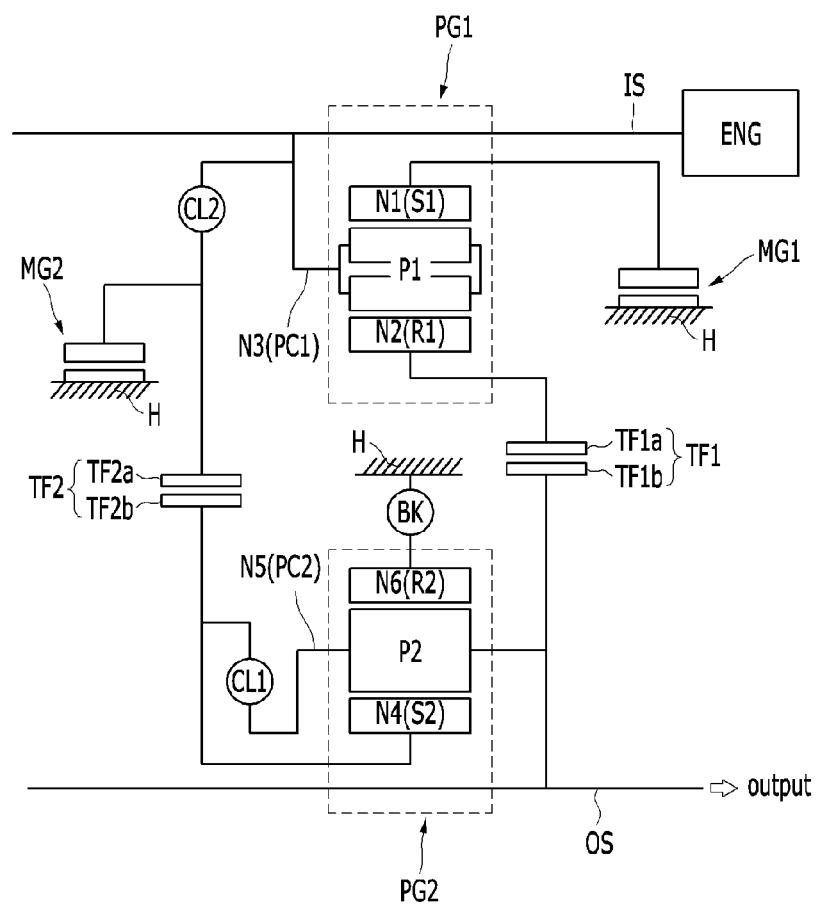
FIG. 9 is a schematic diagram of a power transmission system according to the fourth exemplary embodiment of the present disclosure.

FIG. 9 is a schematic diagram of a power transmission system according to the fourth exemplary embodiment of the present disclosure.

Referring to FIG. 9, the first planetary gear set PG1 is a double pinion planetary gear set in the fourth exemplary embodiment, whereas the first planetary gear set PG1 is the single pinion planetary gear set in the first exemplary embodiment.

Therefore, the first sun gear S1 is the first rotation element N1, the first ring gear R1 is the second rotation element N2, and the first planet carrier PC1 is the third rotation element N3.

The fourth exemplary embodiment have the same functions as those of the first exemplary embodiment except the rotation elements consisting of the second and third rotation elements N2 and N3, therefore, detailed description thereof will be omitted.

Figure 10:
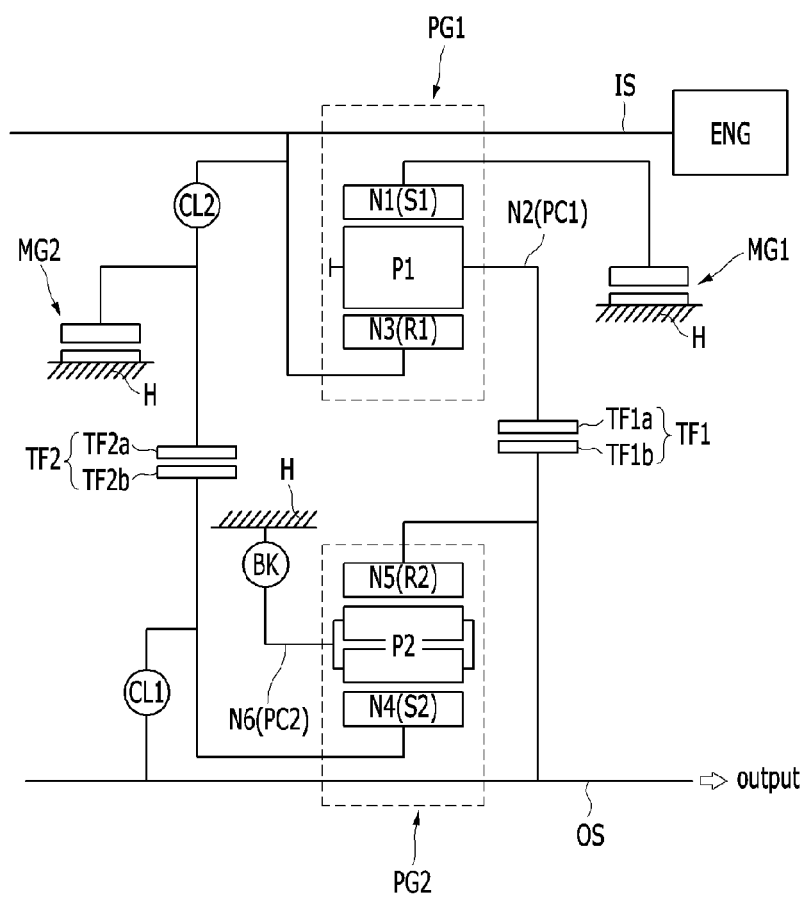
FIG. 10 is a schematic diagram of a power transmission system according to the fifth exemplary embodiment of the present disclosure.

FIG. 10 is a schematic diagram of a power transmission system according to the fifth exemplary embodiment of the present disclosure.

Referring to FIG. 10, the second planetary gear set PG2 is a double pinion planetary gear set in the fifth exemplary embodiment, whereas the second planetary gear set PG2 is the single pinion planetary gear set in the first exemplary embodiment.

The second sun gear S2 is the fourth rotation element N4, the second ring gear R2 is the fifth rotation element N5, and the second planet carrier PC2 is the sixth rotation element N6.

The fifth exemplary embodiment have the same functions as those of the first exemplary embodiment except the rotation elements consisting of the fifth and sixth rotation elements N5 and N6, therefore, detailed description thereof will be omitted.

According to the exemplary embodiments of the present disclosure, two EV modes, three hybrid input split modes, and two engine modes are achieved by combining two planetary gear sets, two transfer gears, three friction elements, and two motor/generators.

Optimum gear ratios may be set due to ease of changing gear ratios by using two transfer gears as externally-meshed gears as well as the planetary gear sets. Gear ratios can be changed according to target performance, thus improving starting performance, power delivery performance and fuel economy.

Since sufficient power performance is provided in a wide open throttle (WOT) start, conversion to the engine mode is limited, and maximum power of the engine can be used in the conversion between the hybrid input split mode and the compound split mode.

The electric load may be reduced and the maximum power of the engine may be used by giving more importance to the mechanical power delivery path when splitting the engine power. Further, the number of mode conversions may be decreased when starting the vehicle, and change in rotation speed of all the rotation elements may be minimized when converting modes.

Since the engine mode is provided, the vehicle can run with high speed without the electric load of the motor/generator, thus improving fuel economy.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A power transmission system of a hybrid electric vehicle, comprising:
an input shaft receiving a torque of an engine;
an output shaft disposed in parallel with the input shaft;
a first planetary gear set disposed on the input shaft, and including a first rotation element connected to a first motor/generator, a second rotation element operating as an output element, and a third rotation element directly connected to the input shaft and selectively connected to a second motor/generator;
first transfer gearing connected to the second rotation element;
a second planetary gear set disposed on the output shaft, and including a fourth rotation element connected to the second motor/generator through second transfer gearing and selectively connected to the third rotation element, a fifth rotation element connected to the second rotation element through the first transfer gear and connected to the output shaft, and a sixth rotation element selectively connected to a transmission housing;

a direct-coupling device connecting two rotation elements among selected from the group consisting of the fourth, fifth, and sixth rotation elements of the second planetary gear set; and at least one friction element selectively connecting at least one of the rotation elements to at least one of the first and second transfer gearing or selectively connecting at least one of the rotation elements to the transmission housing, wherein each transfer gearing includes a transfer drive gear and a transfer driven gear engaged with the transfer drive gear.

2. The power transmission system of claim 1, wherein the first planetary gear set is a first single pinion planetary gear set, the first single pinion planetary gear set having a first sun gear as the first rotation element, a first planet carrier as the second rotation element, and a first ring gear as the third rotation element, and the second planetary gear set is a second single pinion planetary gear set, the second single pinion planetary gear set having a second sun gear as the fourth rotation element, a second planet carrier as the fifth rotation element, and a second ring gear as the sixth rotation element.

3. The power transmission system of claim 1, wherein the first planetary gear set is a double pinion planetary gear set, the double pinion planetary gear set having a first sun gear as the first rotation element, a first ring gear as the second rotation element, and a first planet carrier as the third rotation element, and the second planetary gear set is a single pinion planetary gear set, the single pinion planetary gear set having a second sun gear as the fourth rotation element, a second planet carrier as the fifth rotation element, and a second ring gear as the sixth rotation element.

4. The power transmission system of claim 1, wherein the first planetary gear set is a single pinion planetary gear set, the single pinion planetary gear set having a first sun gear as the first rotation element, a first planet carrier as the second rotation element, and a first ring gear as the third rotation element, and the second planetary gear set is a double pinion planetary gear set, the double pinion planetary gear set having a second sun gear as the fourth rotation element, a second ring gear as the fifth rotation element, and a second planet carrier as the sixth rotation element.

5. The power transmission system of claim 1, wherein the direct-coupling device is a first clutch disposed between the fourth rotation element and the fifth rotation element.

6. The power transmission system of claim 1, wherein the direct-coupling device is a first clutch disposed between the fourth rotation element and the sixth rotation element.

7. The power transmission system of claim 1, wherein the direct-coupling device is a first clutch disposed between the fifth rotation element and the sixth rotation element.

8. The power transmission system of claim 1, wherein the second transfer gearing is disposed between the third rotation element and the fourth rotation element.

9. The power transmission system of claim 1, wherein the at least one friction element is selected from the group consisting of:

a brake disposed between the sixth rotation element and the transmission housing; and a second clutch disposed between the third rotation element and the second transfer gearing.

10. The power transmission system of claim 1, wherein the friction elements comprise:

a brake disposed between the sixth rotation element and the transmission housing; and a second clutch disposed between the fourth rotation element and the second transfer gearing.

11. The power transmission system of claim 1, wherein the direct-coupling device includes a first clutch and the at least one friction element includes a brake and a second clutch, and wherein the brake operates at a first electric vehicle (EV) mode, the first clutch operates at a second EV mode, the brake operates at a first hybrid operation mode, the first clutch operates at a second hybrid operation mode, the second clutch operates at a third hybrid operation mode, the second clutch and the brake operate at a first engine mode, and the first clutch and the second clutch operate at a second engine mode.

12. A power transmission system of a hybrid electric vehicle, comprising:

an input shaft receiving a torque of an engine;

an output shaft disposed in parallel with the input shaft;

a first planetary gear set disposed on the input shaft, and including a first rotation element connected to a first motor/generator, a second rotation element, and a third rotation element directly connected to the input shaft and selectively connected to a second motor/generator;

a second planetary gear set disposed on the output shaft, and including a fourth rotation element selectively connected to the third rotation element and always connected to the second motor/generator, a fifth rotation element connected to the second rotation element and connected to the output shaft, and a sixth rotation element selectively connected to a transmission housing;

a first clutch connecting two rotation elements selected from the group consisting of the fourth, fifth, and sixth rotation elements of the second planetary gear set;

first transfer gearing disposed between the second rotation element and the fifth rotation element, the first transfer gearing including a first transfer drive gear and a first transfer driven gear engaged with the first transfer drive gear;

second transfer gearing disposed between the third rotation element and the fourth rotation element, the second transfer gearing including a second transfer drive gear and a second transfer driven gear engaged with the second transfer drive gear; and friction elements including a brake and a second clutch.

13. The power transmission system of claim 12, wherein the first planetary gear set is a first single pinion planetary gear set, the first single pinion planetary gear set having a first sun gear as the first rotation element, a first planet carrier as the second rotation element, and a first ring gear as the third rotation element, and the second planetary gear set is a second single pinion planetary gear set, the second single pinion planetary gear set having a second sun gear as the fourth rotation element, a second planet carrier as the fifth rotation element, and a second ring gear as the sixth rotation element.

14. The power transmission system of claim 12, wherein the first planetary gear set is a double pinion planetary gear set, the double pinion planetary gear set having a first sun gear as the first rotation element, a first ring gear as the second rotation element, and a first planet carrier as the third rotation element, and the second planetary gear set is a single pinion planetary gear set, the single pinion planetary gear set having a second sun gear as the fourth rotation element, a second planet carrier as the fifth rotation element, and a second ring gear as the sixth rotation element.

15. The power transmission system of claim 12, wherein the first planetary gear set is a single pinion planetary gear set, the single pinion planetary gear set having a first sun gear as the first rotation element, a first planet carrier as the second rotation element, and a first ring gear as the third rotation element, and the second planetary gear set is a double pinion planetary gear set, the double pinion planetary gear set having a second sun gear as the fourth rotation element, a second ring gear as the fifth rotation element, and a second planet carrier as the sixth rotation element.

16. The power transmission system of claim 12, wherein the first clutch is disposed between the fourth rotation element and the fifth rotation element.

17. The power transmission system of claim 12, wherein the first clutch is disposed between the fourth rotation element and the sixth rotation element.

18. The power transmission system of claim 12, wherein the first clutch is disposed between the fifth rotation element and the sixth rotation element.

19. The power transmission system of claim 12, wherein
the brake is disposed between the sixth rotation element and the transmission housing, and
the second clutch is disposed between the third rotation element and the second transfer gearing.

20. The power transmission system of claim 12, wherein the brake is disposed between the sixth rotation element and the transmission housing; and the second clutch is disposed between the fourth rotation element and the second transfer gearing.

* * * * *